United States Patent [19]
Lichte

[11] 3,743,541
[45] July 3, 1973

[54] REDUCTION OF SOLID, LIQUID OR GASEOUS OXIDE-CONTAINING COMPOUNDS

[75] Inventor: Albert Lichte, Wuppertal-Elberfeld, Germany

[73] Assignee: Scholemann Aktiengesellschaft, Dusseldorf, Germany

[22] Filed: Feb. 13, 1968

[21] Appl. No.: 705,048

[30] Foreign Application Priority Data
Feb. 17, 1967 Germany.......................... Sch 40255

[52] U.S. Cl. .............................. 134/2, 75/26, 75/96, 134/10, 148/13.1, 423/646
[51] Int. Cl. ........ C23g 1/00, C22b 1/10, C22b 9/08
[58] Field of Search ..................... 75/26, 91, 93, 97, 75/84; 23/202, 204, 360, 295; 134/21, 2, 15, 42; 148/13, 13.1; 423/646

[56] References Cited
UNITED STATES PATENTS

| | | | |
|---|---|---|---|
| 2,427,339 | 9/1947 | Alexander | 23/204 |
| 2,604,393 | 7/1952 | Smalley | 75/93 |
| 3,460,906 | 8/1969 | Lenz | 23/204 |
| 3,424,614 | 1/1969 | Lichte | 134/2 |
| 2,891,848 | 6/1959 | Jaffe | 75/44 |
| 2,891,881 | 6/1959 | Jaffe | 75/63 |

FOREIGN PATENTS OR APPLICATIONS
926,362  5/1963  Great Britain ......................... 75/26

OTHER PUBLICATIONS
McGraw–Hill Encyclopedia of Science and Technology, Vol. 6, Pp. 531–33 (1966).

Primary Examiner—L. Dewayne Rutledge
Assistant Examiner—Peter D. Rosenberg
Attorney—Holman & Stern

[57] ABSTRACT

A method for the reduction of solid, liquid or gaseous oxide-containing compounds, particularly of oxidic coatings adhering to metal surfaces, by causing the said compounds to react with alkali metal hydride vapor in an atmosphere free from oxygen. The method includes steps for the recovery and re-use of the hydride.

5 Claims, 1 Drawing Figure

PATENTED JUL 3 1973
3,743,541
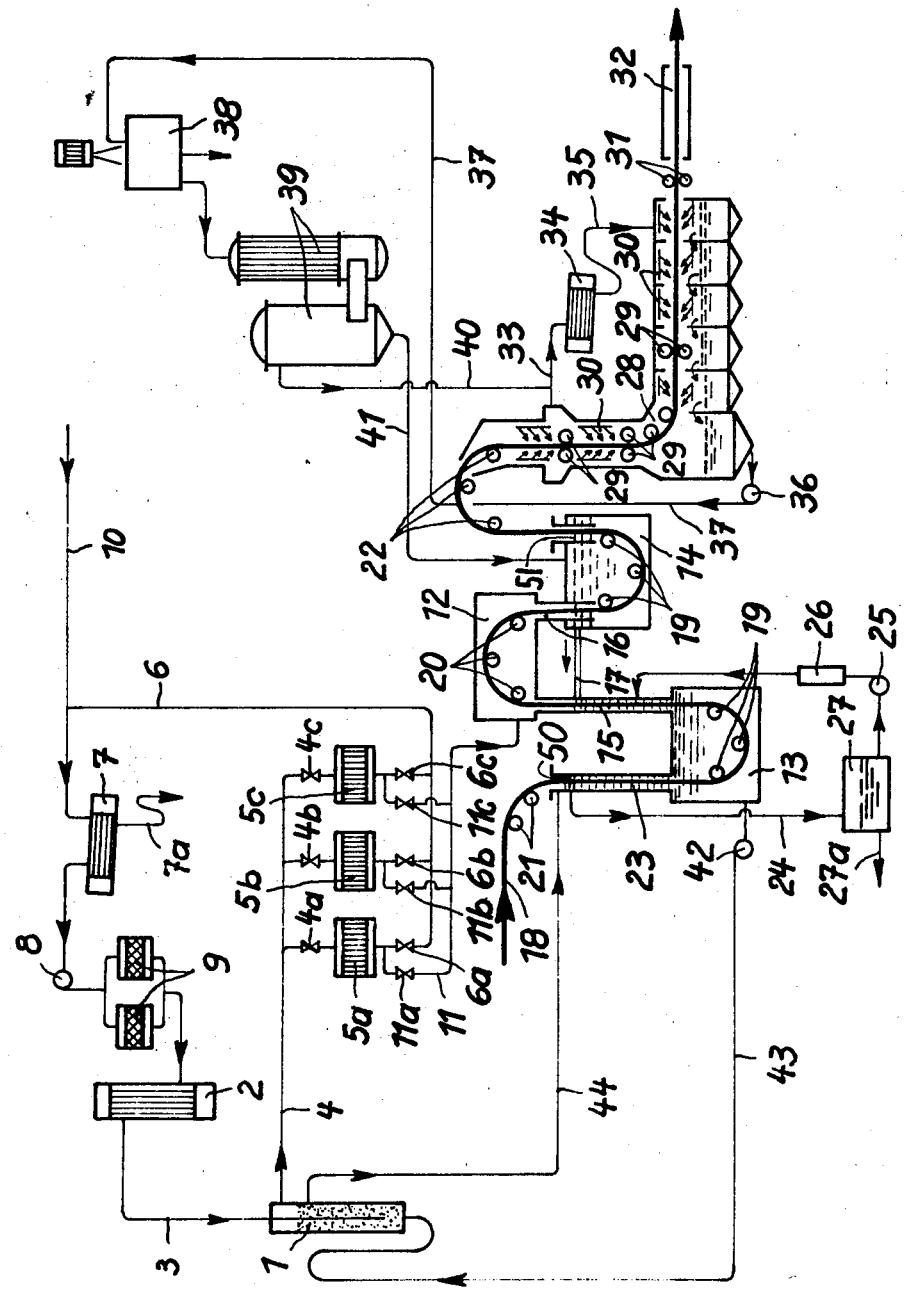
INVENTOR.
ALBERT LICHTE

REDUCTION OF SOLID, LIQUID OR GASEOUS OXIDE-CONTAINING COMPOUNDS

The present invention relates to a method for the reduction of solid, liquid or gaseous oxide-containing compounds, particularly of oxide coatings adhering to the surfaces of metals.

In the metal-treating industry, the reduction of the oxides contained in metals or in compounds containing metals is in most cases carried out by adding carbon as a reducing agent. This may be effected in an oven or furnace, in which case solid carbon, in the form of coke for example, is mixed with the raw material. The carbon then serves both as fuel, for producing the heat of reduction, as well as for the direct reduction of the metals. The carbon monoxide necessary for the indirect reduction occurs as an intermediate product in the gasification of the fuels, from the carbon and the oxygen of the air blow in over carbonic acid ($CO_2$) to promote the combustion, but this, in combination with the glowing carbon, immediately re-forms carbon monoxide, for the further reduction of the metals.

In another process, likewise already operated technically in recent years on a large scale, the reducing gas is not formed in the reaction vessel by gasifying definite fuels, but is added from an external source, in the form of hydrogen, methane, carbon monoxide or mixtures of these gases, with a simultaneous external supply of heat; The advantage of this process over that first mentioned is that the reduced material can be produced, even in a solid condition, that is, in the form of small pieces, and not merely fusible or molten.

In both processes, however, the speed of reaction is comparatively small, and notwithstanding thorough investigation as to the course of the reaction, particularly of the factors that determine the speeds corresponding to the particular circumstances, the improvements hitherto obtained are not satisfactory, either technically or economically. In many cases, also, undesirable impurities have slipped in with the reduction. Industry, therefore, is still seeking cheaper, better, and, in particular, quicker processes.

Moreover processes are known in which the metallic compounds to be reduced are melted, with the addition of carbon, particularly graphite, in the electric furnace, particularly in an induction furnace, an arc furnace, an electron-beam furnace, under vacuum or an atmosphere of inert gas. Through this melt treatment, carried out in the presence of carbon, the oxygen content decreases considerably relatively to the initial product, whereas the carbon content rises considerably, and incidentally attains values which render the material useless, for which reason the metal obtained has to be subjected to further treatment for the separation of the carbon.

For the production of special metals, titanium for instance, the reduction, carried out in the presence of carbon, of the oxide-containing metallic compounds, requires a simultaneous chlorination of the reduction material, in order to resist reoxidation of the metal, which would otherwise occur immediately under the heat of the reaction. The metallic chloride obtained in the chlorination is supplied, after a purification process, to an alkali metal melt, preferably a magnesium melt. Metallic chloride and liquid magnesium react exothermally, with the formation of pure metal, which has the appearance of a sponge which is saturated with magnesium chloride. For the purification of the metallic sponge the latter is heated in a vacuum, and the magnesium chloride partly drips out in a molten or fusible condition and partly distills. The purified metallic sponge can then be melted down again in a vacuum for further treatment, whilst the magnesium chloride, by fusion electrolysis, is separated again into magnesium metal and chlorine gas, and is re-supplied to the process.

Such reduction processes are not only expensive and dear, but above all they take up a great deal of time, and for this reason they are adopted only in special cases, for particular metals, such as titanium, tantalum, zirconium and the like. With the demand for these metals nowadays continually increasing, they are therefore, on general grounds of economy, hardly still obtainable. In addition to this, the constantly increasing requirements as regards quality nowadays, with respect to the purity of the metals, frequently cannot be satisfied.

In the reduction of oxide coatings adhering to metallic surfaces, the adoption of quite a series of further substances as reducing agents is known. Among the most useful are pickling processes, which work with dilute acid solutions, with the assistance, in some instances, of electric current. One disadvantage of these reduction processes is that large quantities of waste water containing acids mostly accrue, which on legal grounds have to be neutralized or otherwise rendered harmless before being discharged. Furthermore, under some circumstances, in the treatment material, a so-called acid brittleness occurs, owing to the accumulation of atomic hydrogen. Further difficulties consist moreover in the frequent chemical passivity of the oxide layers in relation to the acids. If in such cases powerfully acting acids of relatively high concentration are put in, the basic metal is also attacked, which occasions considerable expense (pickling losses) in the treatment of rustless steels or high-grade alloys for instance.

Other reducing processes for the deoxidation of the surfaces of metal articles are based upon the adoption of alkali metal hydride. In a known immersion-bath process the alkali metal hydride is dissolved in an alkali hydroxide melt. In this process sodium hydroxide is most frequently employed, and therefore sodium hydride. The production of sodium hydride is effected by bringing pure sodium metal and hydrogen into the melt, and causing them to react in specially provided generators. Upon the immersion of the metal articles in the melt, the sodium hydride enters comparatively quickly and powerfully into reaction with the oxides and completely reduces them. Sodium hydroxide is here formed, which represents the carrier substance of the immersion bath. Now this experiment has shown that the most optimum economy of this process is given in a melt bath temperature of about 370° C and a sodium hydride content of about 1.7 percent. It has however, also been found in practice that when large immersion tanks are employed, such as are used for example in pull-through or stripping plants for the continuous deoxidation of endless strips, the concentration of hydride contained in the bath is usually no more than 1 percent, since by the great affinity of sodium hydride for atmospheric oxygen, a continual transposition to sodium hydroxide takes place. This process has therefore not been generally adopted.

Another method of reduction, likewise based upon the adoption of alkali metal hydride, consists in spraying the treatment material, in a treatment chamber from which air is excluded, with an alkali metal melt, preferably a sodium melt, enriched with alkali metal hydride. The alkali metal hydride required here is formed, before the spraying, by hydrating the melt in a separate plant, hydrogen being passed through the melt at temperatures from about 340° C. Since in this way much higher hydride concentrations can be reached, the treatment times with this process are also much shorter than with the known hydride immersion-bath process. Even with this process, however, the optimum economy is limited, and lies at about 10 to 13 percent hydride content. In the region of such a concentration of hydride, the treatment time, for the reduction of the various oxide layers of normal steels, amounts, on an average, to from 4 to 7 seconds, whilst for the treatment of high-grade alloys or rustless steels, longer treatment times are required.

In modern treatment plants, for the continuous descaling of steel strips for example, strip speeds nowadays have already reached 200 meters per minute. Strip speeds even twice as high are aimed at, but this has not yet been found practicable, on account of the length of the treatment stretches that would then be required. If one assumes the strip speed already reached, of 200 meters per minute, and presupposes a treatment time of only 7 seconds, this already requires a treatment stretch of about 25 meters. Since the space available in modern industrial plants always requires considerably capital investment, it will be understood that the requirement for quicker and better acting methods of reduction is also always being raised again. This occurs not only for the deoxidation of oxide coatings adhering to metal surfaces, for instance for de-scaling stretches, but also for the reduction of metals or of compounds containing metals. With the good reducing properties, known as such, of alkali metal hydride, for obviating the known disadvantages, in a logical further development of the state of the art, the improving of the known hydride processes by the inclusion of novel measures for increasing the hydride concentration would have been obvious. Nowhere, not even in the general literature, however, was a reference found to a practicable way for this. On the contrary, it is still insisted in the literature that high hydride concentrations are unattainable. Thus it is sometimes asserted that sodium hydroxide can only dissolve at most about 20 percent of sodium hydride. Even in a sodium metal melt the solubility is limited, in which case the solution, with a small sodium hydride content, proceeds quite quickly, but at a higher concentration is so retarded that, as already mentioned, with a hydride concentration of about 15 percent, the economy falls so low that technology cannot accept it. The degree of saturation should lie at a hydride concentration of about 40 percent. Sodium hydride, which is laboriously produced from sodium at 340° C in a current of hydrogen, is not safe for handling on account of its great affinity for oxygen, and is therefore marketed only in oily dispersions. Such dispersions, however, are not employable for reducing purposes.

The subject of the present invention is an improved method, which, while precluding the defects inherent in the known methods of reduction, attains, with low operating costs, a substantial acceleration of the course of the reaction. Requiring but little space, the present invention permits a considerably increased throughput and is suitable both for the production of oxide-free metals or metallic compounds and for the satisfactory elimination of oxidic surface contaminations of metal articles without the material under treatment having to be subjected to an additional intermediate treatment or after-treatment. The aim of the invention is a completely continuous method of working. It is based on the discovery that an economical operation is given only when the reducing agent can be recovered from the product of the reaction directly, that is to say, without any intermediate treatment stages. A further aim of the invention, therefore, is to indicate a process for the production of a reducing agent suitable for this purpose.

The method according to the invention, which is based, upon the use of alkali metal hydride, is distinguished from known methods of reduction by the feature that the material under treatment is brought into action with alkali metal hydride vapor in an atmosphere free from oxygen.

The main advantage of this vapor process consists primarily in the feature that the alkali metal hydride is to be brought to the treatment material at a concentration of almost 100 percent, whereby an immediate instantaneous reduction of all the oxides is obtained, without attacking or contaminating the basic metals. The necessary treatment times are no more than 1 second, so that even when used in continuous treatment installations, the requisite treatment lengths can be kept extremely short. Secondly, alkali metal hydride vapor may likewise be utilized for the treatment of melts, granular material, or solid articles. The process according to the invention is therefore suitable both for the reduction of oxide-containing metals or compounds of metals and for the de-oxidation of metallic surfaces. Thus the reduction of metal melts by the use of sodium hydride vapor is very simple to carry out in a continuous method of working.

A further feature of the method according to the invention consists in the fact that for the production of the alkali metal hydride vapor, alkali metal hydride crystals, preferably sodium hydride crystals, are sublimed. The preparation of the sodium hydride crystals is effected according to the invention by the fact that an alkali hydroxide melt, preferably a sodium hydroxide melt, with the exclusion of oxygen, is scavenged with hydrogen at the reaction temperature, in which case, in the chemically unconsumed hydrogen issuing from the melt, alkali metal hydride is carried along as a gaseous component, and is crystallized out by cooling the temperature of the gas to about 200° to 230° C.

By these features the reducing agent is directly produced from the reaction product accruing in the reduction. The process according to the invention thus obviates the very expensive chemical method for the preparation of alkali metal hydride by way of pure alkali metal.

For carrying out the process according to the invention, only comparatively simple apparatus is needed. For the reduction of metals or metallic compounds, the preference will here again be given to the melt treatment. In this case the material under treatment may be melted in any convenient furnace or oven, and thoroughly washed with alkali metal hydride vapor with the exclusion of oxygen. Secondly, the melt, particularly when a completely continuous method of working is desired, for the attainment of an intimate phase exchange between the metallic compound to be reduced and the alkali metal hydride, may be passed through a rectifying column known in itself, through which alkali metal hydride vapor, preferably sodium hydride vapor, is passed in counter-current. This work will preferably be done with a certain excess of sodium hydride vapor, which is drawn off again from the column at the top, in which case the product of reduction, namely sodium hydroxide, at metal-melt temperatures above about 1,400° C is entrained as a gaseous component. By cooling the current of gas below this temperature, the sodium hydroxide may be liquefied, and supplied afresh to the hydration for the production of sodium hydride vapor. At temperatures of the metal melt below 1,400° C a liquid reaction product is formed, which floats upon the surface of the metal melt, and can be drawn off there. The chemically unconsumed sodium hydride vapor may be immediately passed back again in the circuit into the rectifying column.

According to almost the same principle, lump material, or entire metal articles, can also be continuously reduced. Fine-grained material, for instance metallic powder, is preferably treated in an eddy-current bed known in itself, wherein the alkali metal hydride vapor, with an admixture, it may be, of an inert gas, is directly employed as a medium for the production of the eddy current that keeps the powder particles in suspension. It must merely be always borne in mind that the treatment chamber is shut off in an airtight manner from the atmosphere, and does not itself contain any oxygen or gases that contain oxygen. An oxygen-free atmosphere will however very quickly adjust itself in an otherwise fluidtight treatment chamber, since the alkali metal hydride, with the possible presence of atmospheric oxygen, immediately reacts to yield alkali hydroxide.

Alkali metal hydride vapor admits of being introduced without difficulty, as a reducing agent, in all furnaces designed for operating with protective gas, in which case the hydride vapor may form at the same time an atmosphere of protective gas. In this way even special metals, such as titanium, can be reduced satisfactorily, without the very expensive procedure by way of chlorination, and without employing a high vacuum.

In this case it is of exceptional importance that when adopting the reducing process according to this invention, no impurities containing carbon are slipped into the material under treatment. Thus for example a melt containing silicon, for the production of laminations with an extremely low carbon content for electrical apparatus, admits of being very simply produced, by treatment with sodium hydride vapor for instance.

Any other liquid, just like a melt, can also be freed from oxidic constituents by means of alkali metal hydride vapor, which enables the reducing process according to the invention also to be adopted in chemistry, particularly in petro-chemistry.

A further province of application consists in the reduction of gases, for instance in the production of protective gases, for the purpose of withdrawing from them even the smallest residual particles of oxygen or of moisture ($H_2O$).

In the accompanying drawing, which shows diagrammatically a treatment plant designed for carrying out the process according to the invention for the continuous de-oxidation of the surface of an endless steel strip, all the important details of the invention are fully illustrated.

In a reactor 1 an alkali hydroxide melt, preferably a sodium hydroxide melt, at temperatures of at least 600° C is continuously scavenged with hydrogen. The hydrogen is preheated in a gas-heater 2, and is introduced into the reactor 1 by way of a pipe 3. With this reaction, by endothermic accumulation of hydrogen, with simultaneous splitting of the hydroxyl group and with the formation of superheated water vapor, sodium hydride is produced, which is carried along as a gaseous component in the chemically unconsumed hydrogen emanating from the melt. This gaseous mixture ($H_2$ + NaH + $H_2O$) is drawn off from the reactor 1 through a pipe 4, and, by appropriate controlling of the valves 4a, 4b and 4c is passed through one of three crystallizers 5a, 5b or 5c. These crystallizers 5 are in themselves simple nest-of-tubes heat-exchangers, which are made up of a plurality of tubes, the internal surface of which, by means of introduced filling bodies, presents to the alkali metal hydride vapor a particularly large area of surface contact. Furthermore, with each of the crystallizers, is associated a cooling and heating device to be optionally operated.

By cooling the particular crystallizer which is connected to the reactor 1, the gaseous mixture passing through the crystallizer is cooled down to about 200° to 230° C, the sodium hydride present in the gaseous current being deposited in the form of fine crystals upon the relatively cooler surfaces of the tubes and filling bodies. The remaining mixture of hydrogen and water vapor is passed by way of one of the corresponding valves 6a, 6b and 6c and a pipe 6 through a cooler 7, in which the water vapor is condensed and separated out by way of a pipe 7a. The hydrogen leaving the cooler 7 is forced through an adsorber 9 by means of the pump 8 for further drying of the gas, and from there it is passed on into the gas-heater 2 already mentioned, and, after renewed heating, is returned by way of the pipe 3 into the circuit and back into the reactor 1 for renewed reaction. The burned hydrogen is replaced by way of a pipe 10.

With this crystallization process, the degree of filling of the particular crystallizer traversed by the mixture of gases, on the basis of the difference of pressure between the inlet and the outlet of the crystallizer, can be determined fairly accurately. As soon as the desired degree of filling is reached, the flow of gas is changed over, by appropriate switching of the valves 4a, 4b, 4c and 6a, 6b, 6c to another crystallizer.

The filled crystallizer is closed, and, by changing the valves over from cooling to heating, is heated to about 380° C. At temperatures above about 330° C the hydride crystals sublime, and as soon as an appropriate vapor pressure is reached, such pressure obviously being higher than the treatment chamber 12, the hydride vapor, by opening the particular valve 11a, 11b or 11c, is admitted into the treatment apparatus through a pipe 11.

This treatment apparatus consists essentially of a boilerlike treatment chamber 12, which, in a manner known in itself, is shut off from the external atmosphere in an airtight manner by liquid seals 50 and 51. These liquid seals are located in liquid-containers or tanks 13 and 14, respectively which are arranged underneath the treatment chamber 12, and are individually connected with the latter by vertical connecting tubes 15 and 16 respectively. The liquid-containers 13 and 14 are connected with one another by a pipe 17, so that the surface of the liquid in the two containers adjusts itself to the same level. Thus, it will be seen that the pressure maintained in the treatment chamber 12 by means of the liquid seals 50 and 51 and pipe 17 is approximately atmospheric. The strip 18 to be treated is passed through the liquid seals in loops by the apparatus. For the guidance of the strip, deflecting or reversing rollers 19 and 20 are provided, which are journalled within the liquid-containers 13 and 14 and within the treatment chamber 12. Further guiding rollers, for instance the strip entry rollers 21 or the strip exit rollers 22, are located outside the apparatus.

As the liquid seal in the liquid-containers 13, 14, one will advantageously select alkali metal hydroxide, for instance sodium hydroxide, since this substance produces in any case the reaction product accruing in the reduction treatment. Thus the liquid seal 13 serving as the entry sluice may be utilized at the same time for the requisite heating of the strip. In order to provide the necessary length of the heat-transmission tract, the liquid-container 13 in the constructional example is located lower down than the container 14, and is provided with a correspondingly lengthened connecting pipe 15, and a lengthened entry nozzle 23. Furthermore the hydroxide melt present in the container, for the purpose of providing and maintaining the requisite heating temperature, is passed by means of a circulating pump 25 in a circuit through a pipe 24 and a heater 26 which heats the melt up to about 450° C. A storage vessel 27 may be provided in the pipe 24. For the aforementioned temperature of 450° C, a short thermal transmission distance is sufficient to heat the strip 18 under treatment to a temperature of about 370° C.

The strip 18 leaving the treatment apparatus is guided by way of the exit rollers 22, into a water rinsing stretch 28, where it is taken over by brushing rollers 29. In the water rinsing stretch 28, the strip 18 is freed, by spraying with powerful water jets 30, from the reduced oxides and from the alkaline residues still adhering from the liquid-container 14. In conjunction with the water rinsing stretch 28, a pair of squeezing rollers 31 is provided for stripping off the water adhering to the strip 18, as well as a strip-drying stretch 32, working with hot air or equipped with thermal radiators.

Now in order also to recover the sodium hydroxide dissolved in the rinsing water, the water rinsing stretch is constructed in a manner known in itself as cascade rinsing, wherein the fresh water running into the apparatus against the direction of movement of the strip flows over weirs from one cascade to another, and in so doing assumes always higher concentrations of dissolved sodium hydroxide, whilst the rinsing water within each cascade in he circuit is brought on to the strip 18. Only in the first stage of the cascade, that is, in the last water rinsing stage as the strip leaves the water rinsing stage 28, is fresh water sprayed on to the strip. In this way, at the end opposite to the fresh water supply, concentrations of from 30 to 50 percent of sodium hydroxide may be reached. In addition, in the last cascade, that is, in the first water rinsing stage, the strip heat, of about 370° C, is utilized in order to evaporate part of the water in this stage, and also thereby to increase still further the sodium hydroxide concentration. The water vapor arising is sucked away from the rinsing apparatus through a pipe 33 and condensed in a cooler 34, to be returned to the apparatus, through a pipe 35, as fresh water. Moreover the rinsing water of the last cascade stage, enriched with sodium hydroxide, is sucked away by a pump 36 and passed through a pipe 37 into a centrifuge 38, where it is freed from he reduced metal scale and from other solid constituents. From here the rinsing water, with he hydroxide dissolved therein, flows into an evaporating device 39. The evaporated water is sucked away through a pipe 40, and is returned by way of the cooler 34, as condensed water, to the rinsing station 28. The sodium hydroxide recovered in this way from the rinsing water passes through a pipe 41, as salt melt or fused salt, back into the liquid-container 14 of the treatment apparatus, and is fed by the connecting pipe 17 to the liquid-container 13 also.

The feeding of the reactor 1 with sodium hydroxide is effected by the pump 42, which sucks preheated sodium hydroxide out of the liquid tank 13, and passes it through a pipe 43 into the reactor 1. On grounds of safety, the reactor 1 has an overflow pipe 44, which opens into the liquid tank 13. BY way of a pipe 27a excess alkali hydroxide can be drawn out of the apparatus.

During the operation, the particular crystallizer that is delivering the hydride vapor is shut off by the closed valve 4a, 4b or 4c from he reactor 1, and therefore also from the pressure-producer, e.g. the pump 8. The hydride vapor flows by way of the open pipe 11 into the treatment chamber 12 only owing to the vapor pressure produced by the evaporation in the crystallizer, the same vapor pressure obviously being greater than that in treatment chamber 12 and being the same as that prevailing in the crystallizer. If hydride vapor is now consumed in the reduction of the oxides, the vapor pressure in the treatment chamber falls, with the result that in consequence of the equalization of pressure, a quantity of vapor corresponding to the consumption immediately flows out of the crystallizer into the treatment chamber. The vapor pressure must of course be kept as constant as possible by regulating the temperature. The treatment chamber itself must also be maintained at an operating temperature of at least 330° C, in order that the hydride vapor may not recrystallize. In this way, however, an accurate and completely automatic dosing of the supply of vapor, corresponding to the current consumption, and therefore also an economical consumption of vapor, is ensured.

We claim:

1. In a method of reducing oxidic compounds by utilizing alkali metal hydrides as the reducing agent, the improvement comprising the steps of maintaining a non-oxidizing atmosphere at about atmospheric pressure in a treatment chamber containing the oxidic compounds to be reduced and protected against ingress of air; and introducing substantially pure alkali metal hydride in vapor form at a temperature above 330° C, said hydride immediately reducing said oxidic compound upon contact therewith and itself being converted into an alkali metal hydroxide.

2. A method as claimed in claim 1 comprising the further steps of converting said alkali metal hydroxide into alkali metal hydride which is recycled wherein said alkali metal hydroxide is introduced in a molten state at a temperature of at least 600° C into a reactor; agitating said molten hydroxide with hydrogen to produce alkali metal hydride by endothermic accumulation of hydrogen with simultaneous splitting of the hydroxyl groups and formation of superheated water vapor; conveying said alkali metal hydride in gaseous form along with the unconsumed hydrogen to at least one crystallizer; cooling the gaseous alkali metal hydride to crystallize said hydride in the crystallizer; when the crystallizer is sufficiently full of said hydride crystals, shutting off the incoming gas and heating said crystallizer to above 330°C so as to sublime said hydride crystals into gas; then recycling said gaseous alkali metal hydride back into said treatment chamber in substantially pure form.

3. A method as claimed in claim 2 wherein the sublimed gaseous alkali metal hydride is conveyed from said crystallizer to said treatment chamber by the vapor pressure created during sublimation and as the pressure in said treatment chamber falls due to the reaction therein, the vapor pressure is maintained in both said crystallizer and treatment chamber by regulating the temperature in said crystallizer.

4. A method as claimed in claim 2 wherein said unconsumed hydrogen conveyed to said crystallizer is removed therefrom after the hydride crystallizes out, is freed of water by cooling and absorption, and is cycled back into said molten alkali metal hydroxide in a heated condition.

5. A method as claimed in claim 2 wherein said oxidic compound is an oxide coated steel strip and after said strip is deoxidized in said treatment chamber it is passed through a further treatment area where said strip is subjected to cascade rinsing and the alkali metal hydroxide washed from said strip is reused after it is separated from said liquid.

* * * * *